United States Patent [19]

Puschner

[11] 4,249,061
[45] Feb. 3, 1981

[54] METHOD AND APPARATUS FOR ARC WELDING

[76] Inventor: Peter Puschner, Dreiländerweg 127, Aachen-Vaalserquartier, Fed. Rep. of Germany

[21] Appl. No.: 935,459

[22] Filed: Aug. 21, 1978

Related U.S. Application Data

[63] Continuation of Ser. No. 707,012, Jul. 20, 1976, abandoned.

[30] Foreign Application Priority Data

Jul. 25, 1975 [DE] Fed. Rep. of Germany ....... 2533448
Oct. 20, 1975 [DE] Fed. Rep. of Germany ....... 2546894

[51] Int. Cl.$^3$ .............................................. B23K 9/12
[52] U.S. Cl. .......................... 219/124.22; 219/124.34; 219/137 R
[58] Field of Search ........... 219/137 R, 124.34, 124.1, 219/124.22

[56] References Cited

U.S. PATENT DOCUMENTS

| | | | |
|---|---|---|---|
| 2,920,183 | 1/1960 | Greene | 219/123 |
| 3,204,081 | 8/1965 | Iceland | 219/124.1 |
| 3,346,807 | 10/1967 | Wood et al. | 219/124.1 |
| 3,484,667 | 12/1969 | Wofsey | 219/124.34 |
| 4,151,395 | 4/1979 | Kushner et al. | 219/137 R |

FOREIGN PATENT DOCUMENTS

| | | | |
|---|---|---|---|
| 901203 | 7/1962 | United Kingdom | 219/124.34 |
| 230347 | 3/1969 | U.S.S.R. | 219/124.22 |
| 288189 | 2/1971 | U.S.S.R. | 219/124.1 |

*Primary Examiner*—C. C. Shaw
*Attorney, Agent, or Firm*—Lerner, David, Littenberg & Samuel

[57] ABSTRACT

A process for adjusting a welding torch with respect to a weld joint formed between two workpieces is disclosed, including determining operating quantities for arcs located in at least two positions relative to said weld joint, deriving characteristic values for each of those operating quantities, mathematically combining such characteristic values, and comparing the mathematical combination with a theoretically calculated value for such characteristic values, and then adjusting the position of the welding torch in accordance with the difference between the mathematical combination of those characteristic values and their theoretically calculated value.

An apparatus for effecting such welding torch adjustment is also disclosed, including means for adjusting the welding torch relative to the weld joint, means for producing welding arcs between the welding torch and at least two locations with respect to the weld joint, means for determining characteristic values corresponding to operating quantities of the welding arcs, computer means for mathematically combining those characteristic values, means for comparing the mathematical combination of the characteristic values with a theoretically calculated value for the combination of those characteristic values, in order to produce an output signal corresponding to the difference between those values, and means for controlling the means for adjusting the torch relative to the weld joint in response to that output signal.

17 Claims, 10 Drawing Figures

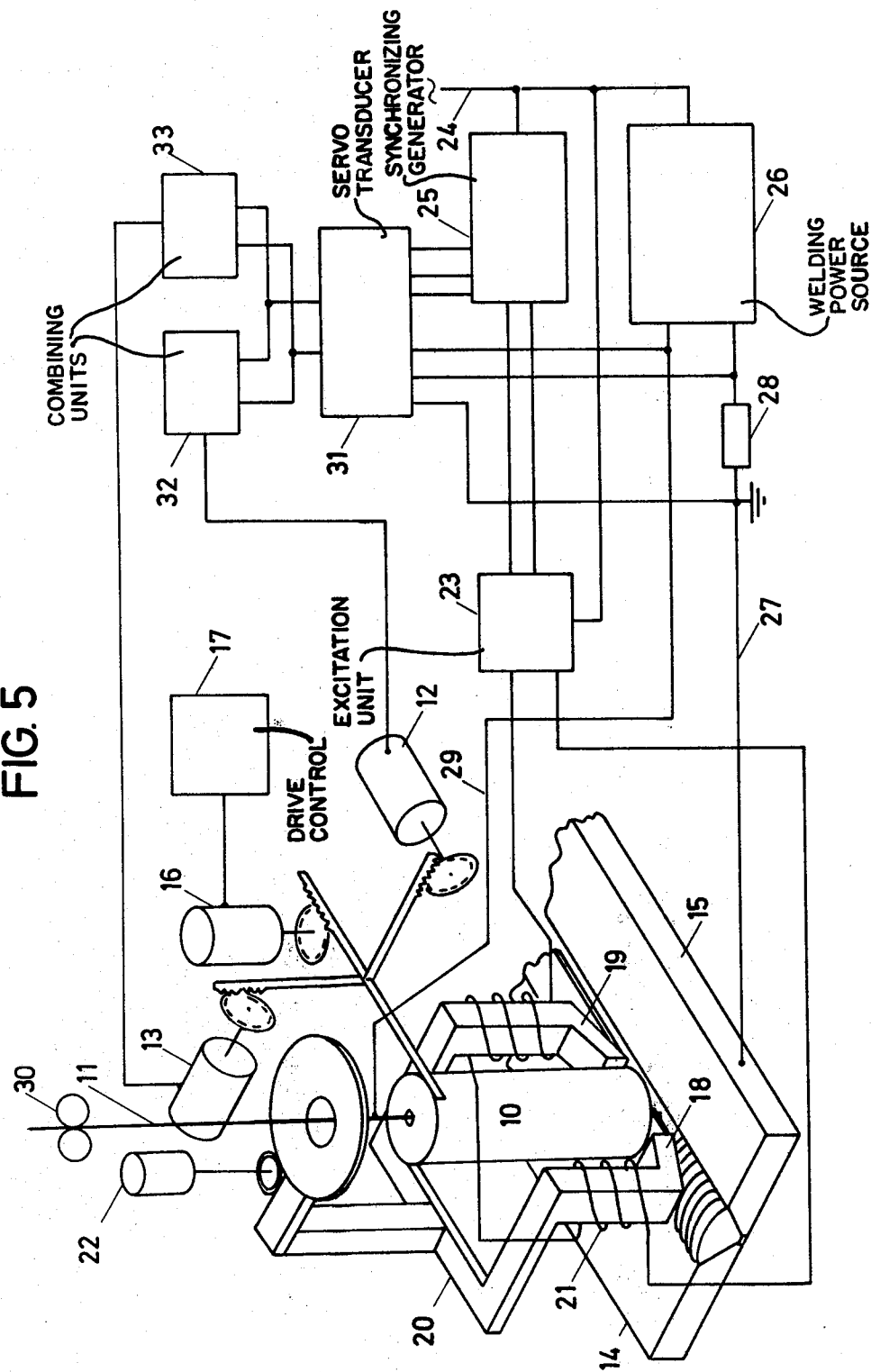

METHOD AND APPARATUS FOR ARC WELDING

This is a continuation, of application Ser. No. 707,012, July 20, 1976, now abandoned.

FIELD OF THE INVENTION

The present invention relates to a process for adjusting a welding torch which is positioned relative to a welded joint formed between two workpieces.

The present invention also relates to an apparatus for adjusting a welding torch relative to such a welded joint.

BACKGROUND OF THE INVENTION

In automatic welding, the aim is to guide the welding torch accurately along the joint. Such a result is presently achieved by forcibly guiding the welding torch or the complete welding units along the joint utilizing mechanical or optical elements, such as guide rolls or photosensors. In such cases, however, the feelers or guide elements must be mounted a safe distance from the arc so that their ability to function is not disadvantageously affected by the side effects of the arc, such as heat and light. Problems can also be caused in such processes by welding spatter, non-uniform seam preparation, binding sites, etc.

Such a process is thus described in U.S. Pat. No. 3,204,081. In that process, the arc is deflected continuously and periodically at right angles to the joint and over the surfaces of the neighboring two workpieces. On crossing the joint, recurring voltage and current impulses are produced periodically, which are employed for the control. At the same time, however, the arc is thereby moved over surfaces of the workpiece which lie outside of the area of the welded joint. The conditions of these surfaces are therefore unfavorably affected by the arc.

SUMMARY OF THE INVENTION

In accordance with the present invention, these and other objects are accomplished, and a welding torch is adjusted with respect to a weld joint formed between two workpieces, by determining an operating quantity for an arc located at a first position relative to the weld joint, determining an operating quantity for an arc located at a second position relative to the weld joint, deriving a characteristic value for each of those operating quantities, mathematically combining these characteristic values, comparing that mathematical combination with the theoretically calculated value for the combination of those characteristic values, and adjusting the position of the welding torch in accordance with the difference between the mathematical combination and the theoretically calculated value for that combination.

In this manner the arc itself is utilized as the sensor for the relative position of the welding torch with respect to the weld joint, and no special additional sensors are thus required for adjusting the welding torch.

In a preferred embodiment of the present invention the welding torch moves along the welded joint, and the derivation of the characteristic values is continuously repeated as the torch moves along the welded joint. The welding torch can thus be guided to follow any curved joint and, depending upon the adjustment desired, can be kept on the center of the joint or at a defined distance from the center of the joint.

Hence in accordance with another embodiment of the invention characteristic values are derived both for a first arc located at a first position relative to a weld joint, and for a second arc located at a second position relative to the weld joint, and the two arcs burn consecutively, so that the characteristic value of the first arc is stored until the characteristic value of the second arc is available, whereupon the two characteristic values are mathematically combined as discussed above. In such a process, it is particularly preferred that the welding arc, that is between the welding torch and a welding puddle in the weld joint, is diverted from its operating position with respect to the weld joint at right angles to that weld joint to a side of the joint, and thus the characteristic values may then be derived from the welding arc and the diverted arc. The welding arc is that arc used for depositing the desired welding bead which takes on an essentially stationary position between the welding torch and the welding puddle.

It is particularly preferred that the diversion of the welding arc occur by utilizing a periodically produced magnetic field, and preferably in a short time interval such that the time span during which the arc is diverted from its operating position does not exceed about 10% of the total welding time. In this manner, the welding is substantially unaffected by such a brief diversion. On the other hand, diversion can also take place in a manner such that the arc burns primarily at the sides of the joint and only for a short time at its center, if such a procedure is advantageously desired for the welding process.

In accordance with another embodiment of the present invention, it is preferred that the operating quantities be electrical quantities, and that the characteristic values be derived therefrom. It is thus also preferred that the characteristic values be derived continuously during movement of the welding torch along the weld joint, and preferably the characteristic values are derived after pauses of at least about 20 milliseconds.

In accordance with another embodiment of the present invention, the welding arc is diverted to the sides of the weld joint at right angles to the weld joint, and preferably in both directions, and the characteristic values are derived from the arc operating quantities of both diverted arcs. This process is especially useful in the welding of symmetrical joints at their center. Thus, for the same diversion on either side of the weld joint, identical characteristic values can be employed as theoretical characteristic values, and in this manner the lateral position of the welding torch is correct if the two characteristic values coincide.

In another such embodiment, the characteristic values of two arcs which are burning simultaneously and next to one another in the weld joint are utilized. These two arcs may, for example, be two welding arcs which burn next to each other, emanating from a pair of electrodes in a welding torch mounted side-by-side.

In accordance with another aspect of the present invention, an apparatus is provided in which a welding torch is movable along a weld joint, and includes a positioning device for adjustment of the welding torch relative to the welded joint, a device for producing an arc between the welding torch and different locations relative to the weld joint and the sides of the weld joint, a measuring device to determine arc operating quantities, a computer means equipped with elements to mathematically combine the characteristic values derived from the operating quantities, and means for comparing the calculated mathematical combination of characteristic values with a theoretically calculated combination of characteristic values in order to produce an output system corresponding to the deviation or difference between the theoretically calculated combination and the mathematically calculated combination, which output signal is then utilized to adjust the positioning device which in turn adjusts the relative position of the welding torch as it moves along the weld joint.

The present invention may be more fully understood with reference to the detailed description provided below, as well as the accompanying drawings.

BRIEF DESCRIPTION OF THE DRAWINGS

FIG. 5 is a partially schematic representation of an apparatus for guiding a welding torch along a weld joint.

DETAILED DESCRIPTION

The process and apparatus of the present invention can be utilized with direct current, alternating current and impulse arc welding devices. Inhomogeneity in the weld joint, e.g., binding sites, etc., do not interfere with the present process, and it can be used for both single and multi-site welding, as well as for welding root and covering layers. This process and apparatus therefore requires no change in the source of the welding current in order to be employed.

Figure 1:
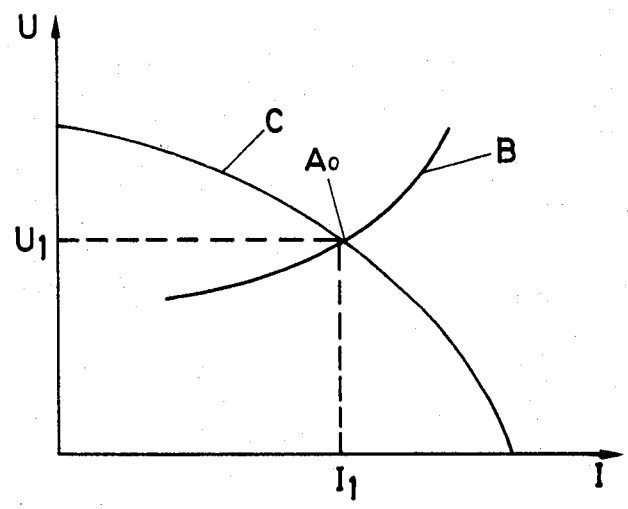
FIG. 1 is a graphical representation of a characteristic load line of an arc welding device and a characteristic arc line therefor.
Figure 2A:
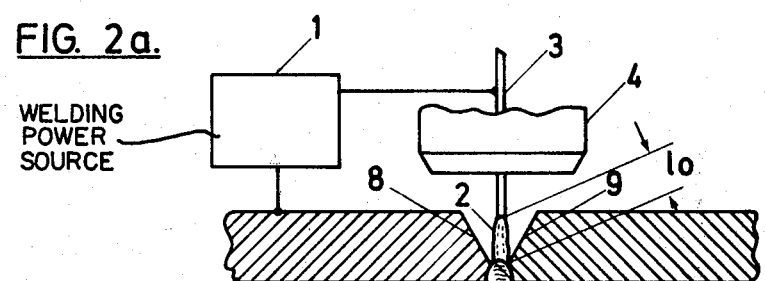
FIGS. 2a-2c are partially schematic, partially sectional views of a welding torch and welding arc at different locations with respect to a weld joint.
Figure 2B:
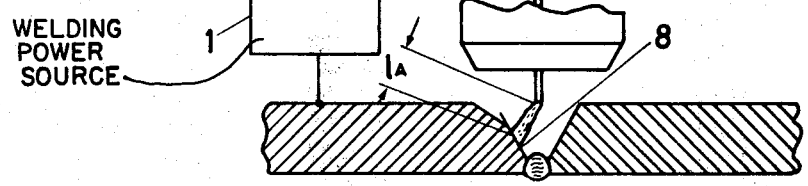

In the case of uninterrupted, automatic arc welding, steady state values for the arc voltage $U_1$ (FIG. 1) and the arc current $I_1$ may be obtained. These values thus coincide with the intersection $A_o$ of the static characteristic load line C of a welding power source 1 and a characteristic arc line B. It can thus be assumed that, under normal welding conditions, the welding arc takes on these operating quantities. Such a welding arc is termed here as an operating welding arc, and is shown in FIG. 2a as an arc column having a length $l_o$. The arc burns stationary between the electrode 3 of welding torch 4, and a welding puddle 5 in a weld joint formed between two workpieces 6 and 7. If the arc is diverted from its operating position to the side 8 of the weld joint (FIG. 2b), which can be brought about, for example, by the application of a magnetic field to the arc, then the arc operating quantities are altered. These operating quantities can include not only electrical quantities such as arc voltage and current, but also other quantities such as, for example, radiation, color temperature and noise, which also characterize such an arc. The electrical operating quantities are, however, generally easier to measure.

Figure 2C:
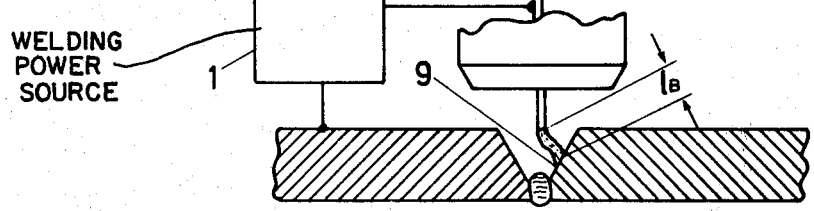
Figure 3:
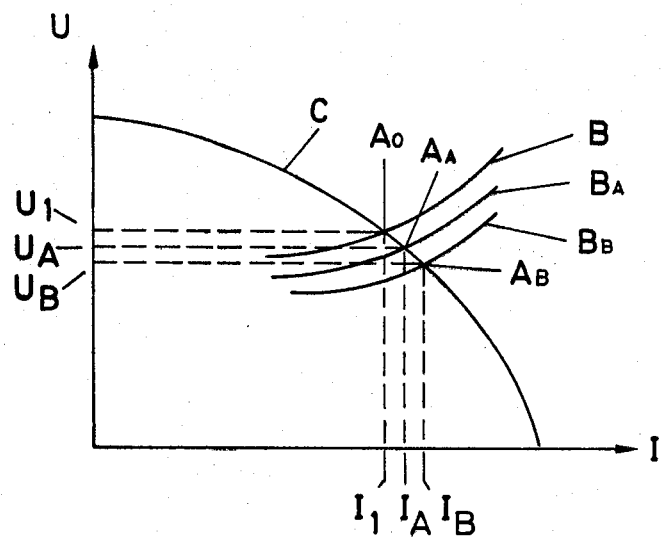
FIG. 3 is a graphical representation of the characteristic lines corresponding to the arcs shown in FIGS. 2a-2c.

A characteristic arc line $B_A$ having a point of intersection $A_A$ with the characteristic load line of the welding power source correspond to the shorter arc length $l_A$ (FIG. 3). Deviation to the other side 9 of the weld joint (FIG. 2c) results in an arc length $l_B$, a characteristic arc line $B_B$ and a point of intersection $A_B$ with the characteristic load line. The corresponding electrical characteristic values in each case are the voltages $U_A$ and $U_B$ and the currents $I_A$ and $I_B$ (FIG. 3).

The weld joint shown in FIG. 2 is a symmetrical V joint. If the deviation of the arc to the two sides 8 and 9 of the weld joint is made equally large, then $l_A = l_B$ when the welding torch is in the center of the weld joint. In this case therefore $l_A - l_B = 0$, and curve $B_A$ and $B_B$ (FIG. 3) show identical behavior.

The lateral position of the welding torch can, for a given deviation, thus always be defined with respect to the difference $l_A - l_B$, and a defined difference can be established based upon the theoretically calculated values for a desired lateral position. The sum $l_A + l_B$ can also thus be used to correct the position of the height of the welding torch, wherein again a defined sum is used as the theoretically calculated value.

Figure 4A:
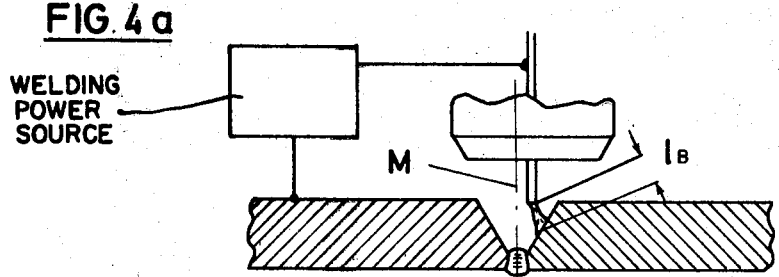
FIGS. 4a, 4b are partially schematic, partially sectional views of a welding torch producing a welding arc with respect to a weld joint, wherein the welding torch is partially displaced from the center of the weld joint.
Figure 4B:
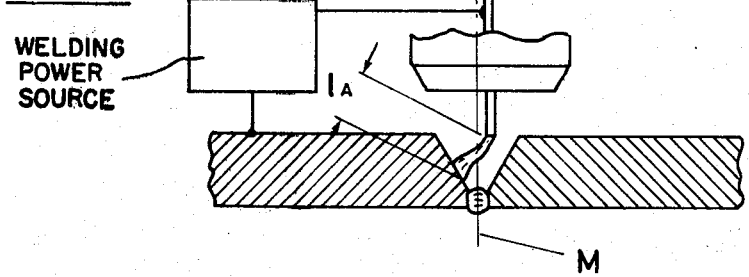

In FIG. 4 an operating case is shown in which, for some reason, the welding torch has moved laterally out of the center position M. This can be caused, for example, by a bend in the weld joint. $l_A$ is thus not equal to $l_B$, and the difference $l_A - l_B$ is no longer equal to zero. In an automatic control system, which will be described below, the deviation from the said theoretically calculated value is used for controlling a servomotor that adjusts the lateral position of the torch.

The same procedure is used when the sum $l_A + l_B$, which is a measure of the position of the height of the welding torch, deviates from the said theoretically calculated value for that sum.

It is not absolutely necessary that the operating quantities of two arc locations which are both diverted from their operating positions be compared. It is also possible to compare the operating quantities for one diverted arc location with the operating quantities for the operating welding arc. However, in the case of symmetrical joints, the diversion of the arc to both sides of the joint is highly preferred, particularly such that the magnitude of the diversion of the arc is kept relatively equal to both sides of the joint.

The device shown schematically in FIG. 5 includes a welding torch 10, which has and guides an electrode 11, and which may be adjusted by a lateral servomotor 12 and a height servomotor 13 relative to a weld joint formed between two workpieces 14 and 15. By means of a drive motor 16, which is actuated by a control device 17, the welding torch 10 can be conveyed along the joint. The arc between the electrode 11 of the welding torch 10 and a position relative to the weld joint can be diverted by a magnetic field, which is produced between the pole shoes 18 and 19 of a magnet yoke 20 by a current flowing in an exciting winding 21. The magnet yoke 20 can be rotated about the electrode axis by means of a motor 22. The direction of the essentially homogeneous magnetic field can thus be adjusted between the pole shoes 18 and 19, relative to the direction of the joint.

The exciting winding 21 is fed by a supply unit 23, which is connected to a circuit 24, that in this case is indicated to be only single poled. The pulse-shaped current flow and its direction in the exciting winding is thereby controlled, for example, by a synchronizing generator 25 set at the circuit frequency. The length of a pulse during each beat is preferably controlled by a phase gating control of thyristors or similarly acting semiconductor elements. A welding current source 26 is connected to the workpiece 15 with one of the current conductors 27, in which a measuring shunt 28 is inserted. The other current conductor is connected to the electrode 11. Depending on the welding method being utilized, either a melting or a non-melting electrode is used. If melting electrodes are used, feed attachments 30 may also be provided. Signals, corresponding to the welding voltage and welding current, are supplied to a servotransducer 31. Characteristic values, derived from these two signals, are supplied in a cycle, determined by the synchronizing generator 25, to control devices 32 and 33 for the lateral and height adjustment by their corresponding servomotors 12 and 13. The control devices 32 and 33 accept the characteristic values, received from the servotransducer 31, and combines these values with the help of analog and/or digital calculator elements, whereupon that result is compared with a theoretically calculated value for that mathematical combination, and the corresponding deviations (i.e., difference between the actual and theoretical values) are used to control the servomotors.

Figure 6:
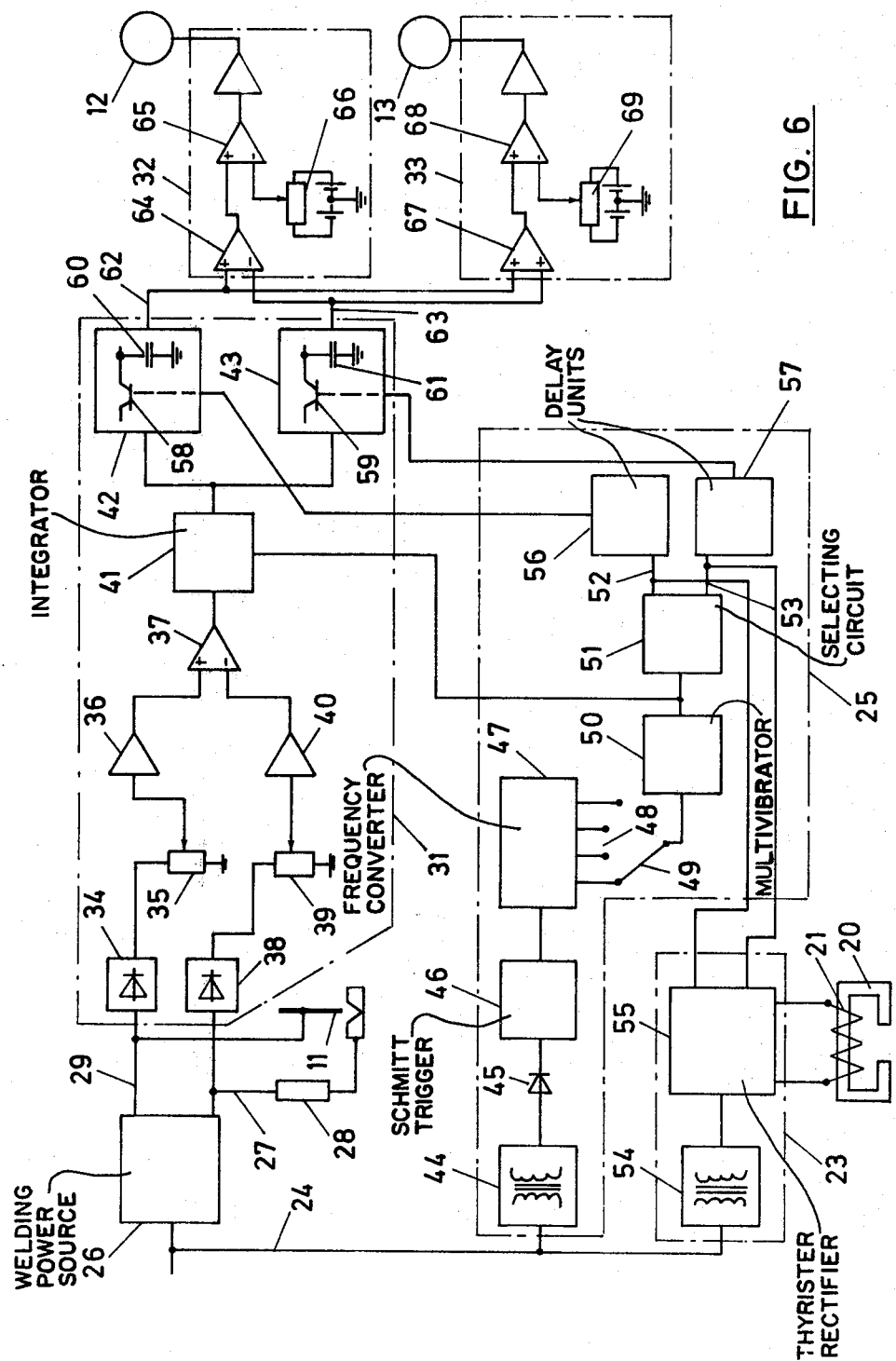
FIG. 6 is a circuit diagram of an apparatus for controlling the lateral and height adjustments of a welding torch including a single electrode.

In FIG. 6 a basic circuit is described in greater detail. This circuit is shown to be single poled, and indicates the path of the various signals. A signal, corresponding to the welding voltage, is applied via a rectifier 34, a potentiometer 35 and an amplifier 36 to the plus input of an operations amplifier 37.

In a similar another signal, corresponding to the welding current, is applied via a rectifier 38, a potentiometer 39 and an amplifier 40 to the minus input of the operations amplifier 37. The difference of the two modified signals is obtained in the operations amplifier 37, and constitutes a measure of the position of the operating point of the arc. It would also, for example, be possible to form the quotient of the voltage and current signals. This quotient would then represent a measure of the arc impedance, and of the change in the arc impedance resulting from diverting the beam. The potentiometers 35 and 39 are preferably adjusted such that the output signal of the amplifier 37 is zero when the arc is not deflected or diverted from the weld joint.

The output signal of the operation amplifier 37 is supplied to an integrator 41, which integrates the output signal, preferably during that time interval in which the signals produced by the deflection of the arc are contained in that output signal. High-frequency portions of the signal, which are primarily due to interference caused by the welding process itself, and which can thus have a disadvantageous effect on the further treatment of the signal, are thus largely suppressed. The command to start the integrator is in each case given by the synchronizing generator 25. The output signal of the integrator 41 is supplied to the inputs of two holding amplifiers 42 and 43, which can be controlled by the synchronizing generator 25.

The synchronizing generator 25 is connected to the alternating current circuit 24, whose voltage is decreased in a transformer 44 and rectified in a rectifier 45. The half waves are converted to square pulses in a Schmitt trigger 46, and the square pulses are supplied to the input of a frequency converter 47. The frequency converter has several outputs 48, at each of which the trigger signal is present with a fixed frequency, which is either equal to the network frequency or to a fraction thereof, and which can be selected with a reversing switch 49. The trigger signal initially passes through a monostable multivibrator 50, whose output signal gives the integrator 41 the command to start. In addition, the trigger signal is conveyed to a selecting circuit 51, which feeds this output signal alternately to output 52 or output 53 of the selecting circuit. The two outputs 52 and 53 are connected with the supply unit 23, and thus control a thyristor rectifier 55, which is supplied from circuit 24 over a transformer 54, and which supplies the exciting current for the exciting winding 21 of the magnet yoke 20. A certain current flow in the magnet yoke corresponds to the signals at outputs 52 and 53, so that the one signal controls a magnetic field that deflects the arc to one side and the other signal deflects the arc to the opposite side.

The duration of each such deflection can be made short by phase gating control, and it can be limited to fractions of the half period of the circuit frequency.

Each deflection thus results in the two signals which are tied together in the operation amplifier 37 and integrated in the integrator 41.

The signals at outputs 52 and 53 are impressed by delay units 56 and 57 alternately to the holding amplifiers 42 and 43, and preferably control the cutting-in of electronic switches 58 and 59 in the holding amplifiers 42 and 43. The switches 58 and 59, and the storage elements 60 and 61 of the holding amplifier, are shown schematically in FIG. 6. The cutting-in of the corresponding holding amplifier through the corresponding delay unit takes place, for example, only after the deflection has been completed. The summation signal at the output of the integrator 41, depending on the presence of the signal at output 52 and 53, is delivered to either of the holding amplifiers 42 or 43, which stores the summation signal until a new signal is impressed. One of the holding amplifiers 42 thus stores consecutively, and in beat with the half frequency of the signal from the frequency converter 47, the summation signals which are produced by deflecting the arc to one side of the joint, while the other holding amplifier 43 stores consecutively the summation signals which are produced by deflecting the arc to the other side of the joint. The integration in the integrator 41 is constantly initiated in beat with the output signal of the multivibrator.

The two stored signals, present at the outputs 62 and 63 of the holding amplifiers 42 and 43, are supplied to the control devices 32 and 33 for lateral and height adjustment, respectively. A difference amplifier 64 in the control device 32 forms the difference of the two signals and that difference is compared in a comparator 65 with a theoretically calculated value, which is set by means of a potentiometer 66. Any deviation thus produced at the output of the amplifier 65 is amplified and, by known procedures, utilized for controlling the laterally adjusting servomotor 12.

In the control equipment 33, the two storage signals at outputs 62 and 63 are summed in an addition amplifier. The summation is compared in a comparator 68 with a theoretically calculated value, which in this case is set by means of potentiometer 69. Any deviation thus produced at the output of the amplifier 68 is amplified and, by known procedures, utilized for controlling the height adjusting servomotor 13.

Figure 7:
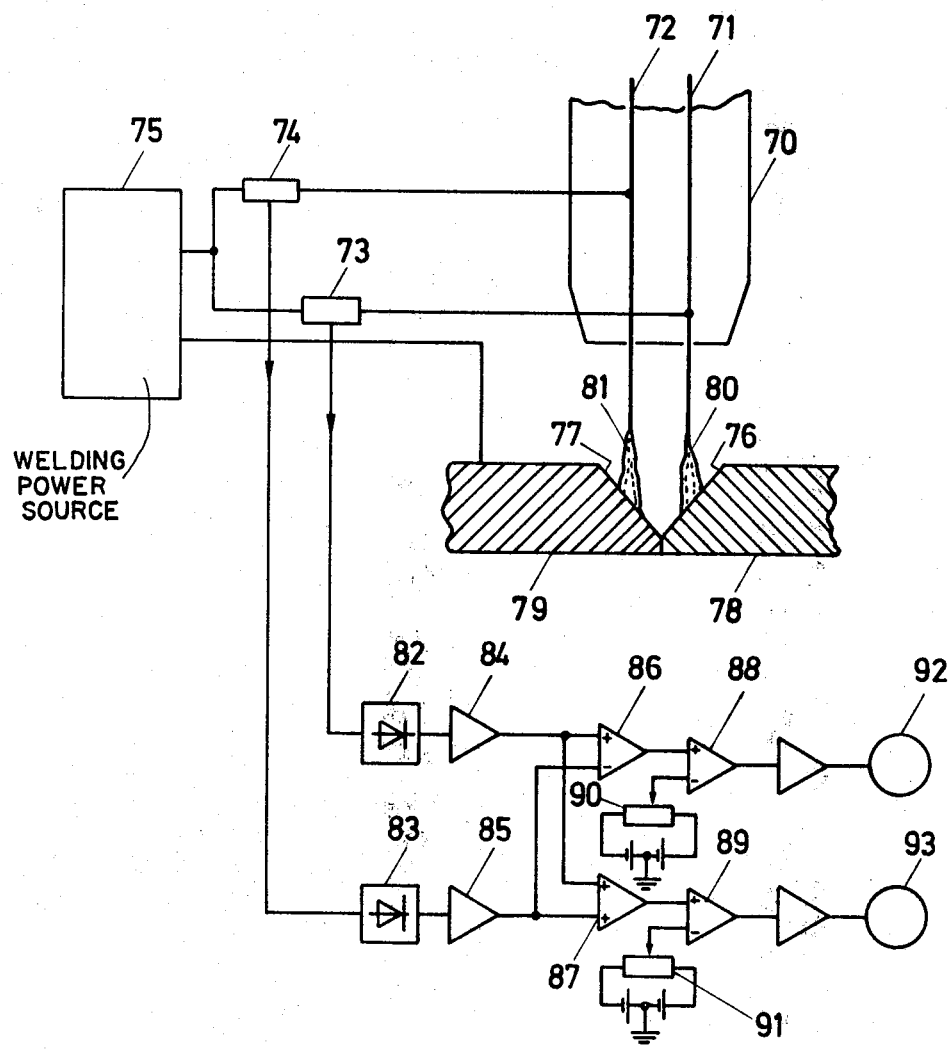
FIG. 7 is a partially sectional, partial circuit diagram of an apparatus for controlling the lateral and height adjustments of a welding torch including two electrodes arranged side-by-side.

By reference to the basic circuit diagram shown in FIG. 7, the mode of operation of a device in which the welding torch is provided with two welding torch elements, each having one electrode, which are either arranged next to one another or laterally displaced and behind one another, the elements being connected to the same welding-current supply and each simultaneously guiding an arc. The two arcs in this case are thus operating welding arcs, and they are not deflected during the operation. The guidance of the welding torch is therefore based on a comparison of stationary operating arc quantities, such as, for example, the welding current and/or the welding voltage. If the arcs are run symmetrically to a symmetrical joint, then the welding torch is in the center of the joint when the arcs are of equal length. In this case also, the difference of two operating arc quantities is used as a measure of the lateral position and the sum as a measure of the height position.

A welding torch 70 thus has two electrodes 71 and 72, which are insulated from one another, guided in the welding torch and each of which is connected to a welding-current source 75 via measuring resistance 73 or 74. Two operating arcs 80 and 81 thus burn between the two electrodes 71 and 72 and the corresponding sides 76 and 77 of the weld joint, in this case a V-joint, formed between two workpieces 80 and 81.

Signals which are proportional to the current are thus produced at the two precision resistors 73 and 74 and fed, via rectifiers 82 and 83 (these are required only for alternating-current welding) and amplifiers 84 and 85 to the input of a difference amplifier 86 and an addition amplifier 87. The difference will thus be a measure of the lateral position of the welding torch relative to the joint, and the sum a measure of the height position of the welding torch. In comparators 88 and 89, the difference and the sum are compared with theoretically calculated values, which are set by means of resistances 90 and 91. The output signals of the comparators 88 and 89 are then amplified, and each used to control one motor, 92 or 93, for the lateral and height adjustment of the welding torch.

In welding with a welding electrode in such a process it is advantageous to use the same electrodes, and to feed them at the same rate to the welding site.

What is claimed is:

1. A method for translationally adjusting the position of a welding torch with respect to a weld joint formed between two workpieces which comprises, determining operating parameters for an arc burning between the welding torch and a first area of said weld joint, determining operating parameters for an arc burning between the welding torch and a second area of said weld joint, deriving separate characteristic values from said operating parameters determined at each area, mathematically combining said characteristic values, comparing the mathematical combination of characteristic values with a theoretically calculated value for said mathematical combination of said characteristic values, and translationally adjusting the position of said welding torch with respect to said weld joint in accordance with the difference between said mathematical combination of said characteristic values and said theoretically calculated value for said mathematical combination.

2. The method of claim 1 wherein said operating parameters comprise electrical quantities corresponding to said arcs.

3. The method of claim 2 wherein said mathematical combination comprises both the difference between said characteristic values and the sum of said characteristic values, said differences between said characteristic values being used to adjust the lateral position of said welding torch with respect to said weld position, and said sum of said characteristic values being used to adjust the height of said welding torch with respect to said weld joint.

4. The method of claim 1 wherein said arc burning between the welding torch and the second area of said weld joint burns subsequent to said arc burning between the welding torch and the first area of said weld joint, and said characteristic value derived for said operating quantity for said arc burning between the welding torch and the first area of said weld joint is stored until said characteristic value for said arc burning between the welding torch and the second area of said weld joint is derived, and wherein said characteristic values are then mathematically combined.

5. The method of claim 4 wherein one of said arcs burning between the welding torch and the first area of said weld joint and burning between the welding torch and the second area of said weld joint comprises an operating welding arc burning between said welding torch and the weld puddle of said weld joint, and said other arc is deflected substantially at right angles to said weld joint from said weld puddle to an area of said weld joint displaced from said weld puddle, and wherein said characteristic values are derived therefrom.

6. The method of claim 5 in which said arcs are deflected by means of a magnetic field.

7. The method of claim 4 wherein the one of said arcs burning between the welding torch and a first area of said weld joint and the other of said arcs burning between the welding torch and a second area of said weld joint are deflected substantially at right angles to said weld joint so that both said first and second areas of said weld joint are displaced from said weld puddle.

8. The method of claim 7 in which said arcs are deflected by means of a magnetic field.

9. The method of claim 1 in which said welding torch is continuously moved along said weld joint, and wherein said characteristic values are repeatedly derived on a substantially continuous basis during said movement of said welding torch.

10. The method of claim 9 wherein there is at least about 20 milliseconds between the repeating derivation of said characteristic values.

11. An apparatus for controllably translationally moving a welding torch with respect to a joint to be welded which comprises:
means for causing relative translational motion between said welding torch and said joint to be welded in a first direction;
means responsive to signals applied thereto for translationally adjusting the relative position of said welding torch and said joint to be welded in a second direction transverse to said first direction;
means for producing arcs between said welding torch and at least two areas of said joint to be welded;
means for determining operating parameters of each of said arcs;
means for generating a separate characteristic value signal from said operating parameters determined at each arc;
means for mathematically combining said characteristic value signals to provide a combined signal;

means for comparing said combined signal with a predetermined value to produce an output signal; and means for applying said output signal to said adjusting means.

12. The apparatus of claim 11 wherein said operating parameters comprise the welding voltage and the welding current of said welding torch.

13. The apparatus of claim 11 wherein said means for translationally adjusting said welding torch relative to said joint includes means for adjusting the lateral position of said welding torch with respect to said joint and means for adjusting the height of said welding torch with respect to said joint.

14. The apparatus of claim 13 wherein said operating parameters of said arcs comprise electrical quantities, and said combining means includes means for obtaining the difference between said characteristic value signals and means for obtaining the sum of said characteristic value signals.

15. The apparatus of claim 11 including means for deflecting said arcs to areas of said weld joint displaced from a weld puddle.

16. The apparatus of claim 15 wherein said means for deflecting said arc comprises an electromagnet whose magnetic field extends transverse to said first direction, and a pulsed current source for exciting said electromagnet.

17. The apparatus of claim 16 including a synchronizing generator for controlling said pulsed current source such that successive current pulses produced thereby alternatingly produce magnetic fields of opposite direction, said synchronizing generator producing a signal responsive to each current pulse for transmission to said means for generating said characteristic value signals for storage of the characteristic value signal generated during the current pulse.

* * * * *